(12) United States Patent
Masuzawa

(10) Patent No.: US 11,460,759 B2
(45) Date of Patent: Oct. 4, 2022

(54) PROJECTOR WITH HOLDER FEATURES

(71) Applicant: SEIKO EPSON CORPORATION, Tokyo (JP)

(72) Inventor: Kenta Masuzawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/202,411

(22) Filed: Mar. 16, 2021

(65) Prior Publication Data

US 2021/0286241 A1 Sep. 16, 2021

(30) Foreign Application Priority Data

Mar. 16, 2020 (JP) .............................. JP2020-045031

(51) Int. Cl.
*G03B 21/14* (2006.01)
*G03B 21/00* (2006.01)

(52) U.S. Cl.
CPC ......... *G03B 21/147* (2013.01); *G03B 21/005* (2013.01); *G03B 21/145* (2013.01)

(58) Field of Classification Search
CPC .... G03B 21/005; G03B 21/008; G03B 21/28; G03B 21/145; G03B 21/147; G03B 21/2013; G03B 21/2033; G03B 21/2053; H04N 9/315; H04N 9/3105; H04N 9/3114; H04N 9/3141; H04N 9/3194
See application file for complete search history.

(56) References Cited

U.S. PATENT DOCUMENTS

| | | | |
|---|---|---|---|
| 10,401,720 B2* | 9/2019 | Kuboya .................. | G03B 21/16 |
| 10,527,756 B2* | 1/2020 | Chou ...................... | G02B 7/022 |
| 2006/0170886 A1* | 8/2006 | Kitabayashi ........... | G03B 43/00 |
| | | | 353/122 |
| 2008/0055571 A1* | 3/2008 | Makii ................. | H04N 5/23248 |
| | | | 353/101 |
| 2012/0229771 A1 | 9/2012 | Hashimoto et al. | |
| 2016/0191874 A1* | 6/2016 | Nozaki ................ | H04N 9/3108 |
| | | | 353/20 |
| 2017/0261846 A1* | 9/2017 | Maes .................... | H04N 9/3161 |
| 2020/0142153 A1* | 5/2020 | Yen ......................... | G03B 21/53 |

FOREIGN PATENT DOCUMENTS

CN 102681307 A 9/2012
JP 2000-241874 A 9/2000

* cited by examiner

*Primary Examiner* — Sultan Chowdhury
(74) *Attorney, Agent, or Firm* — Dority & Manning, P.A.

(57) ABSTRACT

A projector includes a light source, a light modulator that modulates light outputted from the light source, a projection system that projects the light modulated by the light modulator, an image sensor that acquires information on an image projected by the projection system, an enclosure that accommodates the light source, the light modulator, and the image sensor, and a sensor holder that holds the image sensor. The projection system includes a lens barrel which accommodates a lens and through which the light modulated by the light modulator passes. The lens barrel is held by the enclosure via a lens barrel holder. The sensor holder is held by the lens barrel holder.

14 Claims, 6 Drawing Sheets

PROJECTOR WITH HOLDER FEATURES

The present application is based on, and claims priority from JP Application Serial Number 2020-045031, filed Mar. 16, 2020, the disclosure of which is hereby incorporated by reference herein in its entirety.

BACKGROUND

1. Technical Field

The present disclosure relates to a projector including a projection system.

2. Related Art

A projector that adjusts, based on information provided from a sensor, an image projected on a screen has been used. JP-A-2000-241874 discloses a projector of this type. The projector disclosed in JP-A-2000-241874 includes a projection system that projects video images toward a position in front of the projector and a monitor camera disposed in the front surface of the projector, processes an input image inputted from the monitor camera, adjusts the focusing function, the zooming function, and the angle of elevation of the projection system based on information provided from the processed image, and further adjusts trapezoidal distortion of the projected video images.

In a projector of related art including a sensor for acquiring information necessary for video image projection (monitor camera and distance measurement sensor, for example) a large number of parts are interposed between a projection system that projects the video images and the sensor. For example, the projection system is attached to an enclosure of the projector via a holding member made of resin, and the sensor is attached to the enclosure via a sensor holding member separate from the holding member that holds the projection system. Dimension tolerances of the large number of parts therefore accumulate between the sensor and the projection system, resulting in a decrease in the relative positional accuracy of the sensor and the projection system. Further, when deformation of each of the parts due to heat and aging accumulates, the relative positional accuracy the sensor and the projection system can further decrease. Low relative positional accuracy of the sensor and the projection system causes a problem of inaccurate adjustment of projected video images.

SUMMARY

A projector according to an aspect of the present disclosure includes a light source, a light modulator that modulates light outputted from the light source, a projection system that projects the light modulated by the light modulator, a sensor that acquires information on an image projected by the projection system, an enclosure that accommodates the light source, the light modulator, and the sensor, and a sensor holder that holds the sensor. The projection system includes a lens barrel which accommodates a lens and through which the light modulated by the light modulator passes. The lens barrel is held by the enclosure via a lens barrel holder. The sensor holder is held by the lens barrel holder.

DESCRIPTION OF EXEMPLARY EMBODIMENTS

An exemplary embodiment according to the present disclosure will be described below with reference to the drawings. In the present specification, axes X, Y, and Z are shown as three axes perpendicular to one another for convenience of description, with one side of the axis-X direction called a direction +X and the other side of the axis-X direction called a direction −X. Similarly, one side of the axis-Y direction is called a direction +Y and the other side of the axis-Y direction called a direction −Y, and one side of the axis-Z direction is called a direction +Z and the other side of the axis-Z direction called a direction −Z.

Overall Configuration

Figure 1:
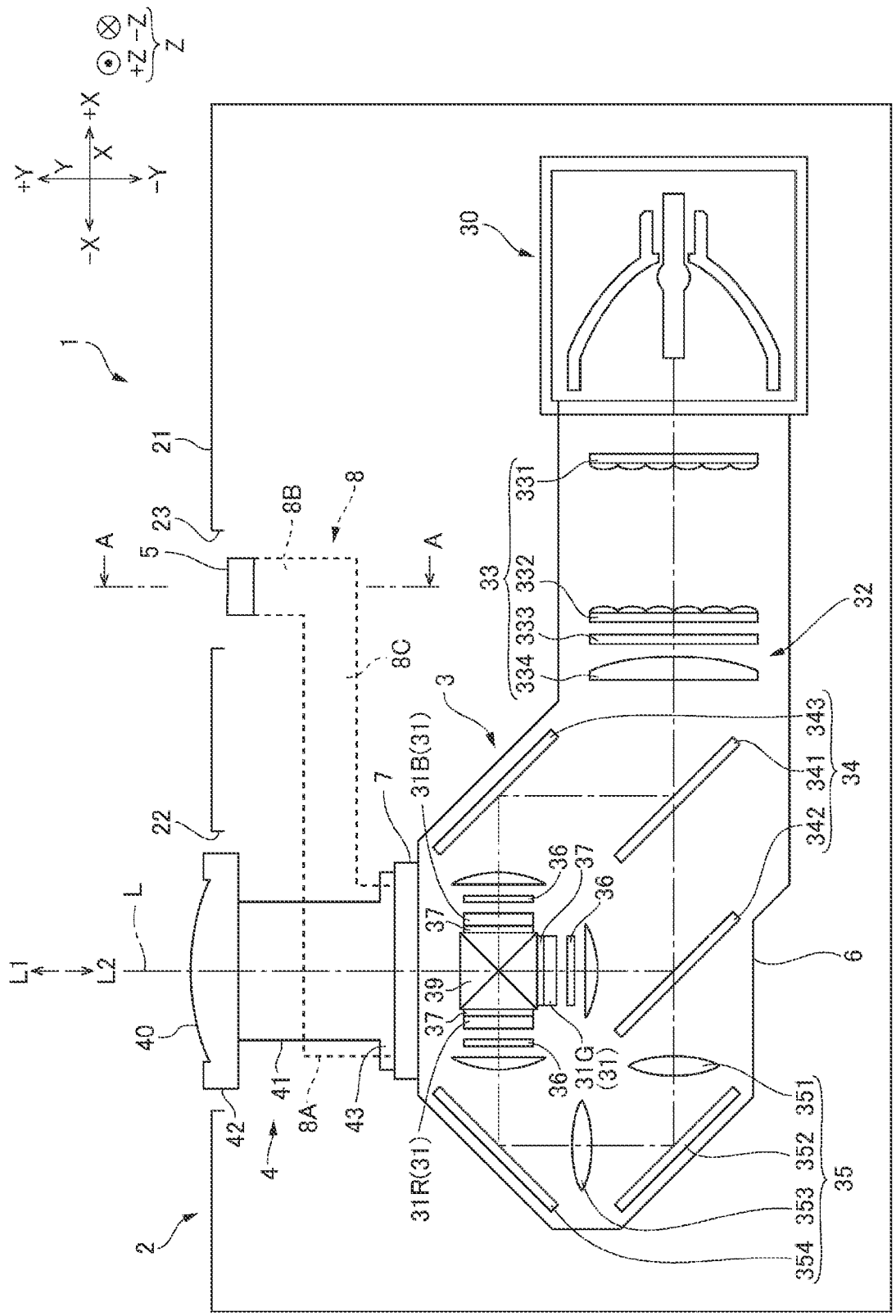
FIG. 1 is a schematic configuration diagram showing a key part of a projector to which the present disclosure is applied.

FIG. 1 is a schematic configuration diagram diagrammatically showing a key part of a projector 1 to which the present disclosure is applied. The projector 1 includes an enclosure 2, a video light generator 3, a projection system 4, and an image sensor 5, as shown in FIG. 1. The video light generator part of the projection system 4, and the image sensor 5 are accommodated in the enclosure 2. In addition to the components described above, a controller, a power supply, a fan, and other components that are not shown are accommodated in the enclosure 2. The projector 1 enlarges and projects video light outputted from the video light generator 3 on a screen (not shown) via the projection system 4. The image sensor 5 captures images projected by the projection system 4, and trapezoidal distortion of the projected video images is corrected based on information obtained from the captured images.

In the following description, let L indicate the direction of the optical axis of the video light that exits out of the projection system 4. Out of one side and the other side of the optical axis direction L, it is assumed that the side via which the light exits out of the projection system 4 (light exiting side) corresponds to a direction L1, and that the side via which light enters the projection system 4 (light incident side) corresponds to a direction L2. The optical axis direction L is parallel to the axis-Y direction. The direction +Y coincides with the direction L1, and the direction −Y coincides with the direction L2. The axis-Z direction is the vertical direction in a situation in which the projector 1 is installed in a typical manner. The direction +Z corresponds to the upper side, and the direction −Z corresponds to the lower side. The axis-K direction is the width direction of the projector 1.

Video Light Generator

The video light generator 3 includes a light source 30 and a light modulator 31, as shown in FIG. 1. The projector 1 according to the present embodiment is an LCD projector, and the light modulator 31 is formed of liquid crystal panels. The light modulator 31 modulates light outputted from the light source 30 based on externally inputted image information. The light source 30 can be a halogen lamp, a metal halide lamp, a high-pressure mercury lamp, or a solid-state light source, such as an LD and an LED.

In the present embodiment, the light modulator 31 includes a light modulator 31R, which modulates red light (hereinafter referred to as "R light"), a light modulator 31G, which modulates green light (hereinafter referred to as "G light"), and a light modulator 31B, which modulates blue light (hereinafter referred to as "B light"). The video light generator 3 further includes an illumination guiding system 32, which separates the light outputted from the light source 30 into three color light fluxes, the R light, the G light, and the B light, and a cross dichroic prism 39, which combines the R light, the G light, and the B light modulated by the light modulators 31R, 31G, and 31B with one another.

The illumination guiding system 32 includes a homogenizing system 33, a color separation system 34, and a relay system 35. The homogenizing system 33 includes a first lens array 331, a second lens array 332, a polarization converter 333, and a superimposing lens 334. The homogenizing system 33 superimposes the light fluxes from the light source 30 with one another on the crystal panels, which form the light modulator 31. The color separation system 34 includes two dichroic mirrors 341 and 342 and a reflection mirror 343 and separates the light fluxes having exited out of the homogenizing system 33 into the R light, the G light, and the B light. The relay system 35 includes a light-incident-side lens 351, a relay lens 353, reflection mirrors 352 and 354. The relay system 35 guides the R light separated by the color separation system 34 to the light modulator 31R.

A light-incident-side polarizer 36 and a light-exiting-side polarizer 37 are disposed on the light incident side and the light exiting side of each of the light modulators 31R, 31G, and 31B. Out of the surfaces of the cross dichroic prism 39, a light-incident-side end surface on which the modulated G light is incident faces the direction L2, a light-incident-side end surface on which the modulated R light is incident faces the direction −X, and a light-incident-side end surface on which the modulated B light is incident faces the direction +X. The cross dichroic prism 39 reflects the R light and the B light modulated by the light modulators 31R and 31B and transmits the G light modulated by the light modulator 31G to combine the three color light fluxes with one another. Full-color video light as a result of the combining operation performed by the cross dichroic prism 39 exits out of the cross dichroic prism 39 in the direction L1 and enters the projection system 4.

The optical parts that form the video light generator 3 are held by an optical part enclosure 6 made of resin and then held by the enclosure 2, which is the exterior case of the projector 1, via the optical part enclosure 6. In the present embodiment, a lens barrel holder 7, which is a resin part separate from the optical part enclosure 6, is disposed in a position shifted from the optical cart enclosure 6 in the direction L1, as shown in FIG. 1. The cross dichroic prism 39 and the light modulators 31R, 31G, and 31B are held by the lens barrel holder 7 and then held by the optical part enclosure 6 via the lens barrel holder 7.

The video light generator 3 in the present embodiment uses transmissive liquid crystal panel s as the light modulator 31 and can instead use light modulators based on another scheme. For example, reflective liquid crystal panels or digital micromirror devices (DMD) can be used as the light modulator 31. The light source 30 and the illumination guiding system 32 do not necessarily have the configurations described above. For example, the relay system 35 may guide the B light to the light modulator 31B in place of the R light. The light outputted from the light source 30 may not be separated into the three color light fluxes, the R light, the G light, and the B light, and light sources that output the R light, the G light, and the B light may be disposed in correspondence with the light modulators 31R, 31G, and 31B.

Projection System

The projection system 4 is disposed on the L1 side of the cross dichroic prism 39 and enlarges and projects the full-color video light having exited out of the cross dichroic prism 39. The projection system 4 includes a plurality of lenses including a first lens 40, which is disposed in a position closest to the magnifying side (light exiting side), and a lens barrel 41, which accommodates the plurality of lenses. The lens barrel 41 holds the plurality of lenses in such a way that the lenses are arranged along the optical axis thereof. A large-diameter tubular section 42, which surrounds the outer circumference of the first lens 40, is disposed at an end of the lens barrel 41 that is the end in the direction L1. The lens barrel 41 is held by the enclosure 2 of the projector 1 via the lens barrel holder 7. The lens barrel holder 7 is held by the optical part enclosure 6, as described above. The lens barrel 41 is therefore held by the enclosure 2 via the lens barrel holder 7 and the optical part enclosure 6. The lens barrel 41 is fixed to the lens barrel holder 7 via a flange 43 provided at an end of the lens barrel 41 that is the end in the direction L2.

Enclosure

The enclosure 2 of the projector 1 has a substantially box-like shape as a whole, as shown in FIG. 1. A front surface 21 of the enclosure 2 is provided with a projection opening 22, which allows an end portion of the projection system 4 that is an end portion in the direction L1 to protrude out of the enclosure 2. The front surface 21 of the enclosure 2 is also provided with a sensor opening 23. The image sensor 5 captures via the sensor opening 23 the video images projected by the projection system 4. In the present embodiment, an end portion of the projection system 4 that is an end portion in the direction L1 protrudes out of the enclosure 2, but not necessarily. The projection system 4 may not protrude out of the enclosure 2, and the entire projection system 4 may be accommodated in the enclosure 2.

Structure that Holds Image Sensor

Figure 2:
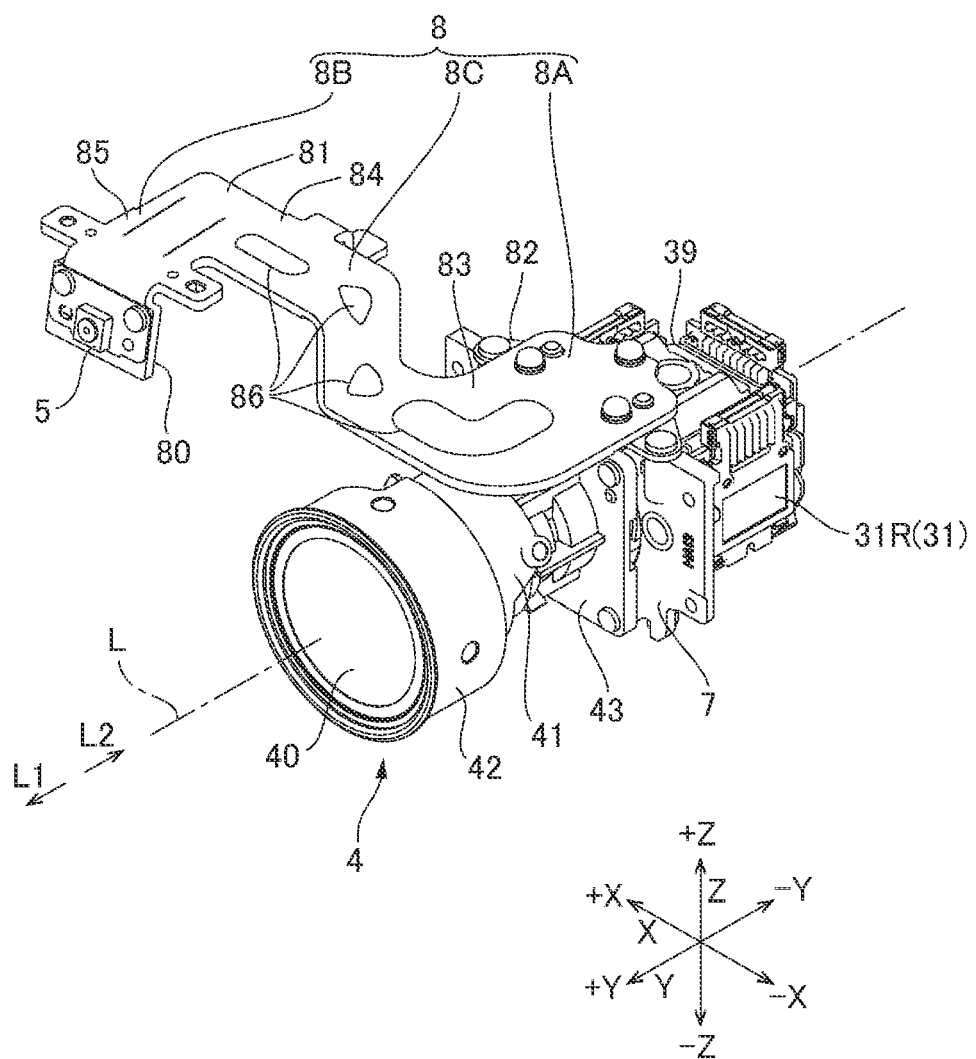
FIG. 2 is a perspective view showing the structure that holds an image sensor.
Figure 3:
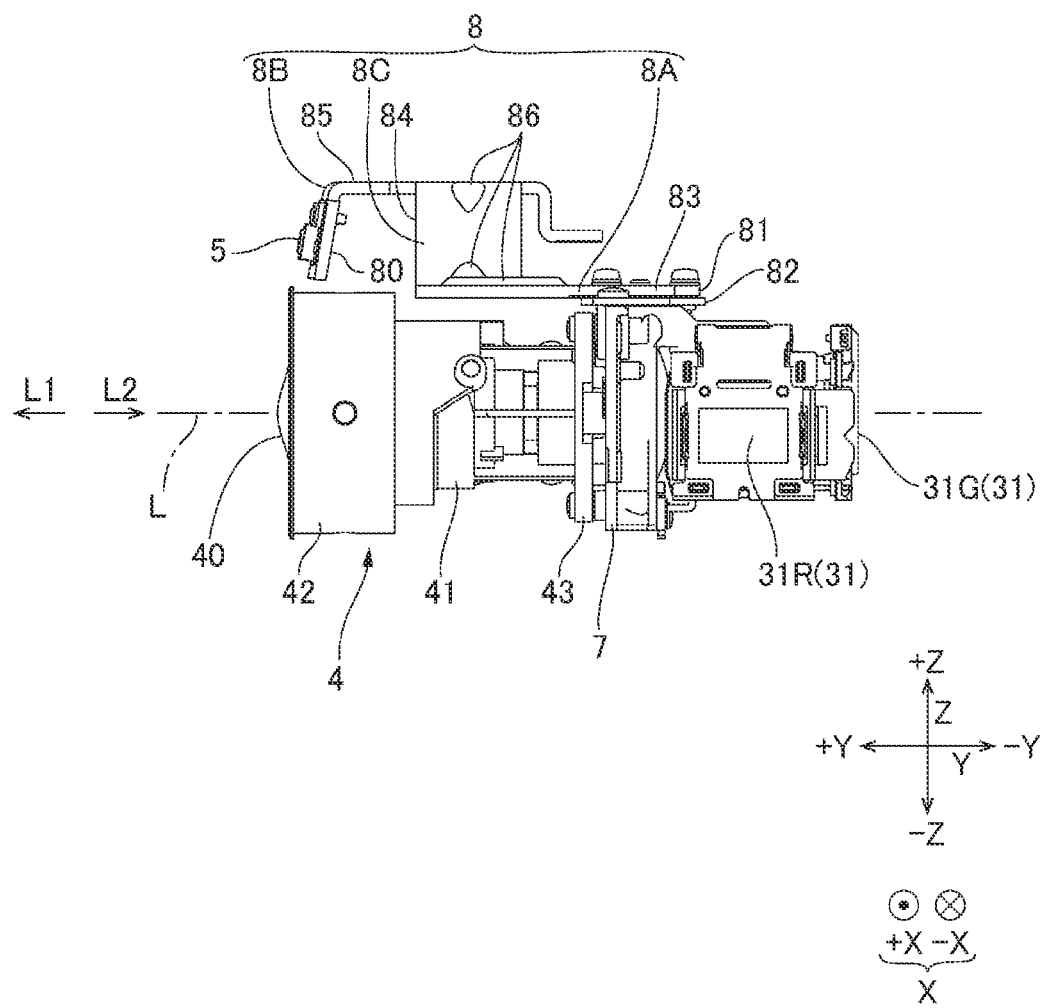
FIG. 3 is a side view showing the structure that holds the image sensor.
Figure 4:
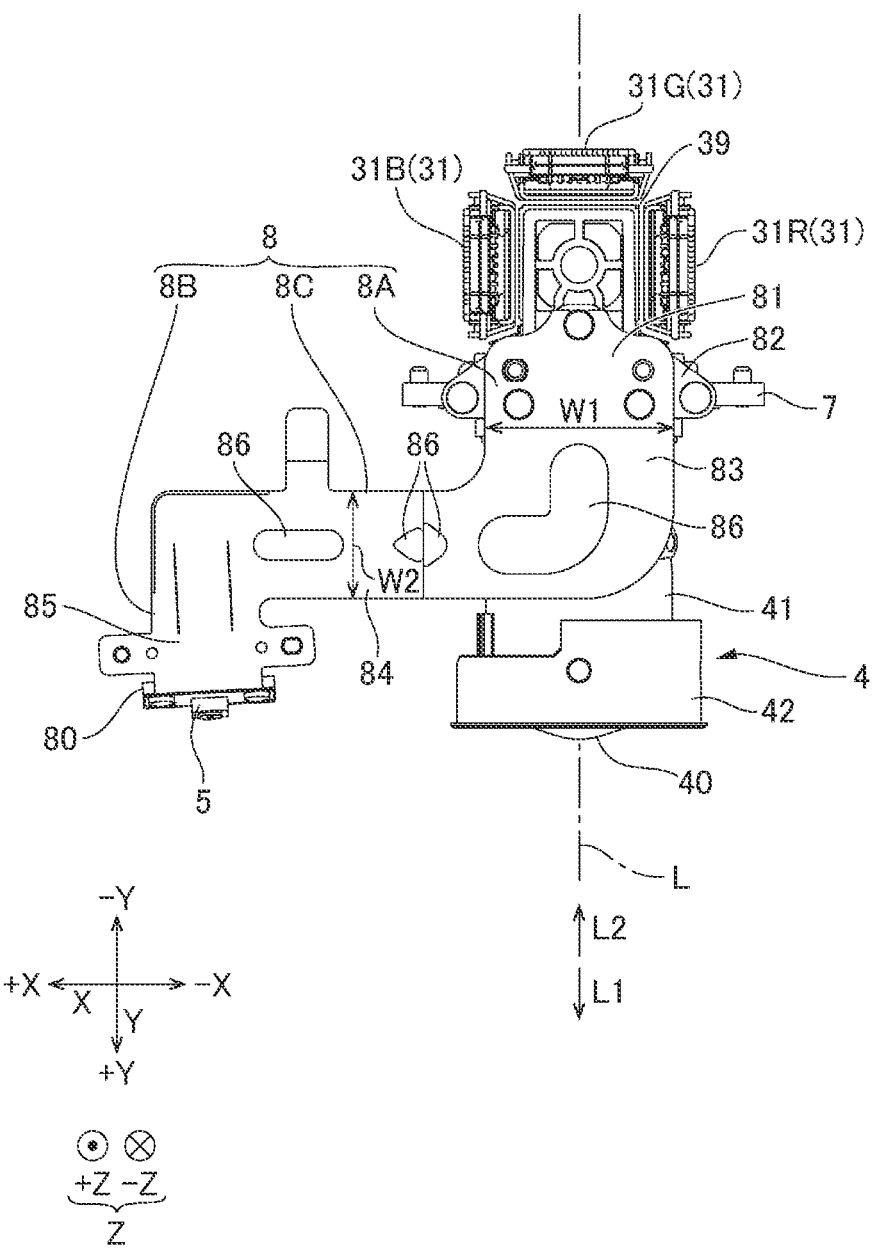
FIG. 4 is a plan view showing the structure that holds the image sensor.

FIG. 2 is a perspective view showing the structure that holds the image sensor 5. FIG. 3 is, a side view showing the structure that holds the image sensor 5. FIG. 4 is a plan view showing the structure that holds the image sensor 5. The projector 1 includes a sensor holder 8, which holds the image sensor 5. In the present embodiment, the sensor holder 8 is held by the lens barrel holder 7. The sensor holder 8 is connected to the lens barrel holder 7 disposed in a position shifted from the lens barrel 41 in the direction L2, as indicated by the broken line in FIG. 1. The sensor holder 8 extends from the lens barrel holder 7 to the L2 side of the sensor opening 23 formed in the front surface 21 of the enclosure 2.

The sensor holder 8 has a coefficient of linear expansion smaller than that of the enclosure 2. In the present embodiment, the enclosure 2 is made of resin, and the sensor holder 8 is made of aluminum. The sensor holder 8 may be made of metal, excluding aluminum. The sensor holder 8 made of aluminum can ensure lightweight and large strength. The impact resistance of the sensor holder 8 can therefore be increased. In the present embodiment, the sensor holder 8 is formed of two members, a first sensor holding member 81, which holds the image sensor 5, and a second sensor holding member 82, which holds the first sensor holding member 81, as shown in FIGS. 2 to 4. The first sensor holding member 81 and the second sensor holding member 82 are each made of aluminum and each have a coefficient of linear expansion smaller than that of the enclosure 2. The second sensor holding member 82 is not necessarily made of aluminum and may be made, for example, of iron or stainless steel.

The sensor holder 3 includes a first section 8A, which is connected to the lens barrel holder 7, a second section 8B, to which the image sensor 5 is connected, and a connection section 8C, which connects the first section 8A and the second section 8B to each other. The first section 8A is disposed in a position above the lens barrel 41 and the lens barrel holder 7 (in direction +Z) and extends in the optical axis direction L, as shown in FIGS. 2 to 4. The connection section 8C extends from the first section 8A in the direction +X of the lens barrel 41. The connection section 8C, while extending in the direction +X, bends substantially at right angles in the direction +Z and then bends substantially at right angles in the direction +X.

The second section 8B extends in the direction L1 from an end of the connection section 8C that is the end in the direction +X. The front end of the second section 8B is provided with a sensor attachment section 80, which bends in the direction −Z, as shown in FIGS. 2 to 4. The sensor attachment section 80 inclines in such a way that a portion thereof closer to the direction −Z advances in the direction L1, as shown in FIG. 3. The image sensor 5 is connected to the sensor attachment section 80 and faces the sensor opening 23.

The first sensor holding member 81 is a sheet metal member that bends at a plurality of locations. The first sensor holding member 81 includes a first plate-shaped section 83, which is located in a position above the lens barrel 41 and the lens barrel holder 7 (in direction +Z) and extends in the optical axis direction L, a second plate-shaped section 84, which extends in the direction +X from an end of the first plate-shaped section 83 that is the end in the direction L1, and a third plate-shaped section 85, which extends in the direction L1 (direction +Y) from an end of the second plate-shaped section 84 that is the end in the direction +X. An end portion of the first plate-shaped section 83 that is an end portion in the direction L2 overlaps with the second sensor holding member 82 in the direction +Z and is fixed to the second sensor holding member 82 with fixing members, such as screws. The second sensor holding member 82 is a flat-plate-shaped sheet metal member. The second sensor holding member 82 is fixed to an end of the lens barrel holder 7 that is the end in the direction +Z. The second sensor holding member 82 covers along the direction +Z an end of the cross dichroic prism 39 that is the end in the direction L1.

The first section 3A of the sensor holder 3 is formed of the first plate-shaped section 83 of the first sensor holding member 81 and the second sensor holding member 82. The connection section 8C is formed of the second plate-shaped section 84 of the first sensor holding member 81, and the second section 8B is formed of the third plate-shaped section 85 of the first sensor holding member 81. The second plate-shaped section 84 includes a bent section that bends substantially at right angles in the direction +Z and a bent section that bends substantially at right angles in the direction +X, as described above. The second plate-shaped section 84 has embossed protrusions 86 disposed at a plurality of locations, and some of the protrusions 86 are disposed at the bent portions. The third plate-shaped section 85 has a front end portion in the direction L1 (direction +Y) that bends in the direction −Z to form the sensor attachment section 80.

Figure 5:
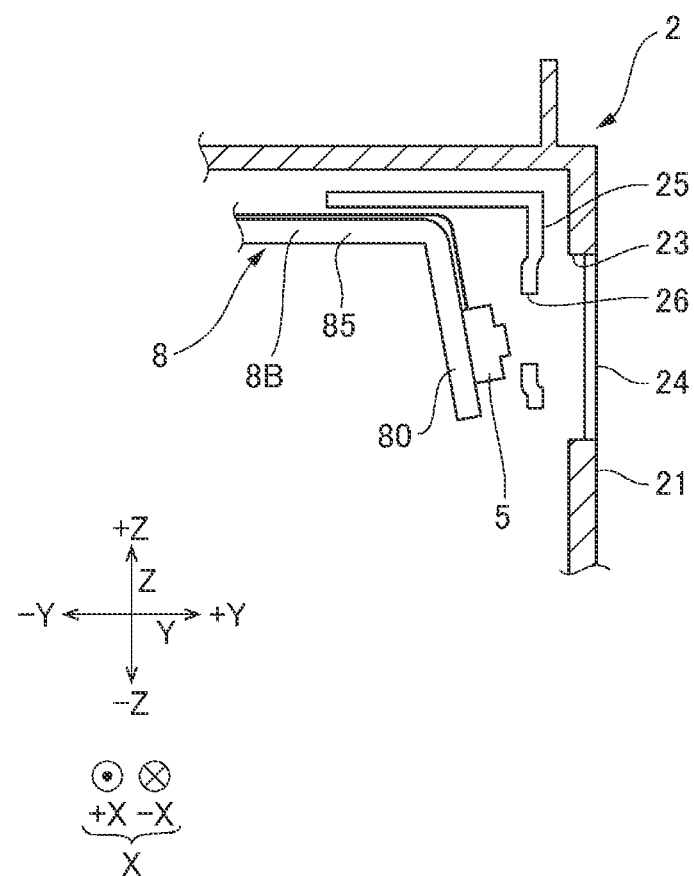
FIG. 5 is a partial cross-sectional view showing the arrangement of a front surface of an enclosure and the image sensor.

FIG. 5 is a partial cross-sectional view taken along the line A-A in FIG. 1 and showing the arrangement of the front surface 21 of the enclosure 2 and the image sensor 5. A cover glass plate 24 is disposed in the sensor opening 23 provided in the front surface 21. The image sensor 5 and the sensor attachment section 80 are disposed in positions separate from the enclosure 2 and are not in contact with the front surface 21 of the enclosure 2, as shown in FIG. 5. In the present embodiment, a sensor cover 25 is disposed between the front surface 21 of the enclosure 2 and the image sensor 5. The sensor cover 25 is separate from the front surface 21 and is therefore not in contact with the front surface 21. The sensor cover 25 has a cover opening 26, which faces the image sensor 5. The image sensor 5 captures via the cover opening 26 and the sensor opening 23 the images projected by the projection system 4. In the present embodiment, a cover member that covers the sensor opening 23 is the cover glass plate 24 made of glass, but not necessarily, and may be a cover made of light transmissive resin.

The sensor holder 8 is so configured that a width W1 of the first section 8A connected to the lens barrel holder 7 is greater than a width W2 of the connection section 8C, as shown in FIG. 4. The width W1 of the first section 8A is the width of the first plate-shaped section 83 of the first sensor holding member 81, and the width of the connection section 8C is the width of the second plate-shaped section 84 of the first sensor holding member 81. The sensor holder 3 is so configured that the first section 8A is connected to the lens barrel holder 7 and the image sensor 5 is connected to the second section 8B, as shown in FIGS. 2 to 4. The sensor attachment section 80 provided to the second section 8B and the image sensor 5 are not in contact with the enclosure 2. The sensor holder 8 therefore has a cantilever structure that supports the image sensor 5.

Primary Effects and Advantages of Present Embodiment

As described above, the projector 1 according to the present embodiment includes the light source 30, the light modulator 31, which modulates the light outputted from the light source 30, the projection system 4, which projects the light modulated by the light, modulator 31, the image sensor 5, which acquires information on an image projected by the projection system 4, the enclosure 2, which accommodates the light source 30, the light modulator 31, and the image sensor 5, and the sensor holder 8, which holds the image sensor 5. The projection system 4 accommodates lenses and includes the lens barrel 41, through which the light modulated by the light modulator 31 passes. The lens barrel 41 is held by the enclosure 2 via the lens barrel holder 7, and the sensor holder 8 is held by the lens barrel holder 7.

As described above, in the present embodiment, the sensor holder 8, which holds the image sensor 5, and the lens barrel 4 in the projection system 4 are both held by the lens barrel holder 7. The lens barrel holder 7 is a member interposed between the lens barrel 41 and the enclosure 2. The enclosure s therefore not present in the structure that connects the sensor holder 8 to the lens barrel 41 and the number of members interposed between the image sensor 5 and the projection system 4 is small. A decrease in the relative positional accuracy of the image sensor 5 and the projection system 4 can therefore be suppressed, whereby a decrease in correction accuracy resulting from a decrease in the relative positional accuracy of the image sensor 5 and the projection system 4 can be suppressed when trapezoidal distortion is corrected based on information acquired from an image captured with the image sensor 5. Trapezoidal distortion produced by the projector 1 can therefore be precisely corrected.

In the form described above, the lens barrel holder 7 and the optical part enclosure 6 are parts separate from each other, and the lens barrel holder 7 may instead be integrated with the optical part enclosure 6.

In the present embodiment, the sensor holder 8 includes the first sensor holding member 81, which holds the image sensor 5, and the second sensor holding member 82, which holds the first sensor holding member 81, and the second sensor holding member 82 is held by the lens barrel holder 7. As described above, dividing the sensor holder 8 into the two parts can suppress influence of foreign matter produced in the assembly of the projector 1. For example, the second sensor holding member 82 is attached to the lens barrel holder 7 in advance, and the lens barrel 41 is then connected to the optical part enclosure 6 via the lens barrel holder 7. Thereafter, the first sensor holding member 81 is fixed to the second sensor holding member 82. The second sensor holding member 82 is so shaped as to cover the upper side (side in the direction +Z) of an end of the cross dichroic prism 3 that is the end in the direction L1, as described above. Connecting the sensor holder 8 to the lens barrel holder 7 in the order described above can therefore reduce the possibility of a situation in which foreign matter produced, for example, when a member is fastened with screws falls on the cross dichroic prism 39.

In the present embodiment, the first sensor holding member 81 has a coefficient of linear expansion smaller than that of the enclosure 2. The second sensor holding member 82 also has a coefficient of linear expansion smaller than that of the enclosure 2. Using a member having a small coefficient of linear expansion allows reduction in deformation of the sensor holder 8 due to heat. Positional shift of the position of the image sensor 5 from a designed position that occurs when the image sensor 5 is used in a high-temperature environment can therefore be suppressed, whereby a decrease in the relative positional accuracy of the image sensor 5 and the projection system 4 can be suppressed.

In the present embodiment, the first sensor holding member 81 is made of metal, such as aluminum. The second sensor holding member 82 is made of metal, such as aluminum. When a resin part is used as the sensor holder 8, deformation of the sensor holder 8 increases with time due to a load even at room temperature, whereas when a metal part is used as the sensor holder 8, the deformation with time due to a load is unlikely to occur as long as the projector 1 does not operate in a high temperature environment. Therefore, in the present embodiment, a shift of the position of the image sensor 5 from the design position at room temperature can be suppressed. A decrease in the relative positional accuracy of the image sensor 5 and the projection system 4 can be suppressed. The first sensor holding member 81 and the second sensor ho ding member 82 in the present embodiment are each a sheet metal that is a processed metal plate and may instead be a cast or forced part.

In the present embodiment, the sensor holder 8 includes the first section 8A, which is connected to the lens barrel holder 7, the second section 818, to which the image sensor 5 is connected, and the connection section 85, which connects the first section 8A to the second section 8B, and the width W1 of the first section 8A greater than the width W2 of the connection section 85, Therefore, the strength of the first section 8A connected to the lens barrel holder 7 can be ensured, and the weight of the sensor holder 8 can be reduced. Deformation of the sensor holder 8 can therefore be suppressed, whereby a decrease in the relative positional accuracy of the image sensor 5 and the projection system 4 can be suppressed. In the present embodiment, the sensor holder 8 has a cantilever structure that supports the image sensor as described above. The configuration in which the width W1 of the first section 8A connected to the lens barrel holder 7 greater than width 8A of the connection section 8C can therefore ensure the strength of a portion of the sensor holder 8 that is the portion to which the largest load is applied and reduce the weight of the sensor holder 8. Deformation of the sensor holder 8 can therefore be suppressed, whereby a decrease in the relative positional accuracy of the image sensor 5 and the projection system 4 can be suppressed.

In the present embodiment, the sensor holder 8 includes the sensor attachment section 80, to which the image sensor 5 is connected, and the sensor attachment section 80 and the image sensor 5 are separate from the enclosure 2. The enclosure 2 is therefore not present in the structure that connects the image sensor 5 to the lens barrel 41, whereby the enclosure 2 does not affect the relative positional accuracy of the image sensor 5 and the lens barrel 41.

In the present embodiment, the image sensor 5 is held by the sensor holder 8 variety of types of adjustment can therefore be made based on information acquired from an image captured with the image sensor 5. For example, in the present embodiment, trapezoidal distortion is corrected based on the information acquired from an image captured with the image sensor 5. In the present embodiment, a decrease the relative positional accuracy of the image sensor 5 and the projection system 4 can be suppressed, as described above. A decrease in correction accuracy resulting from a decrease in the relative positional accuracy of the image sensor 5 and the projection system 4 can therefore be suppressed.

Variation 1

Figure 6:
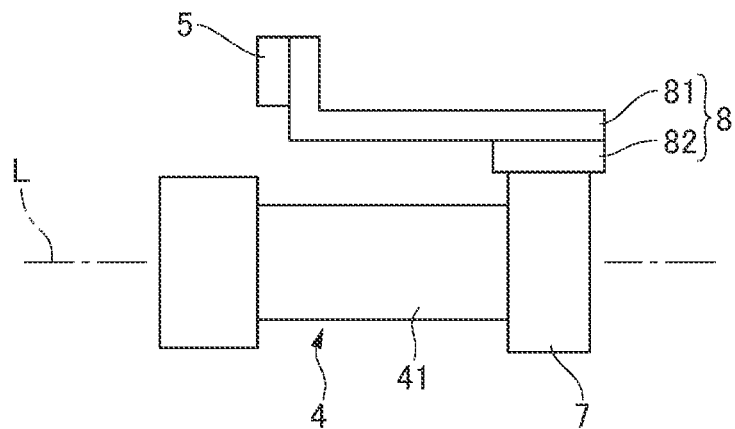
FIG. 6 is a descriptive diagram diagrammatically showing the structure that holds the image sensor shown in FIGS. 2 to 4.
Figure 7:
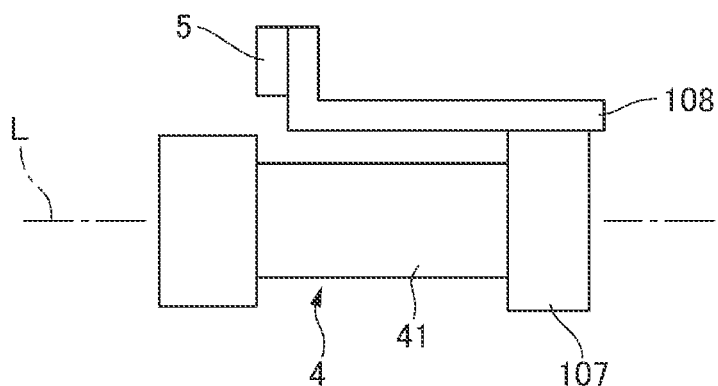
FIG. 7 is a descriptive diagram diagrammatically showing Variation 1 of the structure that holds the image sensor.
Figure 8:
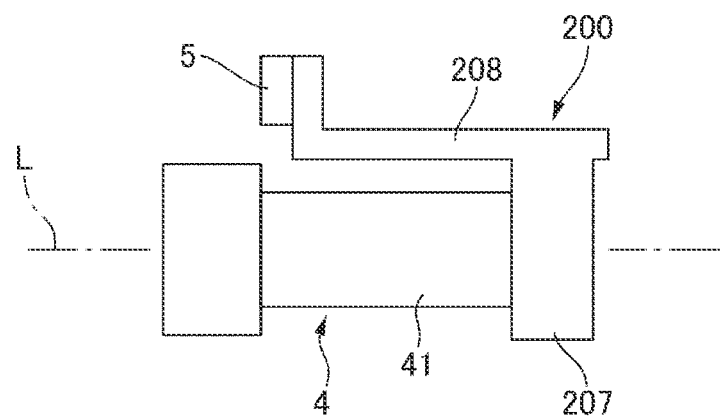
FIG. 8 is a descriptive diagram diagrammatically showing Variation 2 of the structure that holds the image sensor.

FIGS. 6 to 8 are descriptive diagrams each diagrammatically showing a structure that holds an image sensor. FIG. 6 is a descriptive diagram diagrammatically showing the structure that holds the image sensor 5 shown in FIGS. 2 to 4. In the form described above, the sensor holder 8 is formed of the two members, the first sensor holding member 81 and the second sensor holding member 82, and three members, the first sensor holding member 81, the second sensor holding member 82, and the lens barrel holder 7, are interposed between the image sensor 5 and the projection system 4 in the structure that connects the image sensor 5 to the projection system 4.

FIG. 7 is a descriptive diagram diagrammatically showing Variation 1 of the structure that holds the image sensor 5. A sensor holder 108 in Variation 1 is formed of a single member, as shown in FIG. 7. One end of the sensor holder 108 is connected to a lens barrel holder 107, and the image sensor 5 is connected to the other end of the sensor holder 108. The lens barrel 41 of the projection system 4 is connected to the lens barrel holder 107.

For example, the sensor holder 108 in Variation 1 may be the same member as the first sensor holding member 81 in the form described above or an integrated member formed of the first sensor holding member 81 and the second sensor holding member 82 in the form described above. When the first sensor holding member 81 is used as the sensor holder 108, the second sensor holding member 82 and the lens barrel holder 7 in the form described above may be integrated with each other and used as the lens barrel bolder 107.

In the configuration in Variation 1, the enclosure 2 is not interposed between the sensor holder 108 and the lens barrel 41 in the structure that connects the sensor holder 108 to the lens barrel 41, and the sensor holder 108 and the lens barrel 41 are each held by the lens barrel holder 107, as in the form described above. The number of members interposed between the image sensor 5 and the projection system 4 is therefore two, the sensor holder 108 and the lens barrel holder 107, which is smaller than the number in the form described above, whereby a decrease in the relative positional accuracy of the image sensor 5 and the projection system, can be further suppressed than in the form described above. Trapezoidal distortion can therefore be precisely corrected.

Variation 2

FIG. 8 is a descriptive diagram diagrammatically showing. Variation 2 of the structure that holds the image sensor 5. In Variation 2, the image sensor 5 is held by a holding member 200 which is an integrated member formed of a sensor holder 208 and a lens Darrel holder 207. For example, the holding member 200 is an integrated member formed of the first sensor holding member 81 and the lens barrel holder 7 in the form described above. In Variation 2, the lens barrel 41 and the image sensor 5 are each connected to the holding member 200. The number of members interposed between the image sensor 5 and the projection system 4 in the structure that connects the image sensor to the projection system 4 is therefore one, which is further smaller than the number in Variation 1, whereby a decrease in the relative positional accuracy of the image sensor 5 and the projection system 4 can be further suppressed. Trapezoidal distortion can therefore be precisely corrected.

Other Forms

The present disclosure is applicable to an aspect in which a sensor held by the sensor holder 8 is a sensor other than an image sensor. For example, in the form described above and Variations 1 and 2, the sensor held by the sensor holder 8 may be a distance measurement sensor using infrared light, laser light, or any other type of light or an ultrasonic wave. The distance measurement sensor can sense the distance to an image projected by the projection system 4, and a variety of types of adjustment, such as adjustment of the focusing function of the projection system 4, can be made based on the sensed distance.

What is claimed is:

1. A projector comprising:
a light source;
a light modulator that modulates light outputted from the light source;
a projection system that projects the light modulated by the light modulator;
a sensor that acquires information on an image projected by the projection system;
a projector enclosure that accommodates the light source, the light modulator, and the sensor;
a sensor holder that holds the sensor; and
an optical part enclosure that holds the light modulator,
wherein the projection system includes a lens barrel which accommodates a lens and through which the light modulated by the light modulator passes,
the lens barrel is held by the projector enclosure via a lens barrel holder,
the sensor holder is held by the lens barrel holder,
the lens barrel holder is held by the optical part enclosure, and
the sensor holder has a cantilever structure held by the lens barrel holder.

2. The projector according to claim 1, wherein the optical part enclosure is held by the enclosure.

3. The projector according to claim 1, wherein the sensor holder includes a sensor attachment section to which the sensor is connected, and the sensor attachment section and the sensor are separate from the enclosure.

4. The projector according to claim 1, wherein the optical part enclosure holds the light source.

5. The projector according to claim 1, wherein the lens barrel holder and the optical part enclosure are integrated with each other into a single part.

6. The projector according to claim 1, wherein the sensor holder is integrated with the lens barrel holder.

7. The projector according to claim 1, wherein the sensor is an image sensor.

8. The projector according to claim 1, wherein the sensor is a distance measurement sensor.

9. A projector comprising:
a light source;
a light modulator that modulates light outputted from the light source;
a projection system that projects the light modulated by the light modulator;
a sensor that acquires information on an image projected by the projection system;
a projector enclosure that accommodates the light source, the light modulator, and the sensor;
a sensor holder that holds the sensor; and
an optical part enclosure that holds the light modulator,
wherein the projection system includes a lens barrel which accommodates a lens and through which the light modulated by the light modulator passes,
the lens barrel is held by the projector enclosure via a lens barrel holder,
the sensor holder is held by the lens barrel holder, and
the lens barrel holder is held by the optical part enclosure, and
wherein the sensor holder includes
a first sensor holding member that holds the sensor, and
a second sensor holding member that holds the first sensor holding member, and
the second sensor holding member is held by the lens barrel holder.

10. The projector according to claim 9, wherein the first sensor holding member has a coefficient of linear expansion smaller than a coefficient of linear expansion of the projector enclosure.

11. The projector according to claim 9, wherein the second sensor holding member has a coefficient of linear expansion smaller than a coefficient of linear expansion of the projector enclosure.

12. The projector according to claim 9, wherein the first sensor holding member is made of metal.

13. The projector according to claim 9, wherein the second sensor holding member is made of metal.

14. A projector comprising:
a light source;
a light modulator that modulates light outputted from the light source;
a projection system that projects the light modulated by the light modulator;
a sensor that acquires information on an image projected by the projection system;

a projector enclosure that accommodates the light source, the light modulator, and the sensor;
a sensor holder that holds the sensor; and
an optical part enclosure that holds the light modulator,
wherein the projection system includes a lens barrel which accommodates a lens and through which the light modulated by the light modulator passes,
the lens barrel is held by the projector enclosure via a lens barrel holder,
the sensor holder is held by the lens barrel holder, and
the lens barrel holder is held by the optical part enclosure, and
wherein the sensor holder includes
   a first section connected to the lens barrel holder,
   a second section to which the sensor is connected, and
   a connection section that connects the first section and the second section to each other, and
   a width of the first section is greater than a width of the connection section.

\* \* \* \* \*